US012341998B2

(12) United States Patent
Kelly et al.

(10) Patent No.: US 12,341,998 B2
(45) Date of Patent: *Jun. 24, 2025

(54) METHODS AND SYSTEMS FOR NON-DESTRUCTIVE STABILIZATION-BASED ENCODER OPTIMIZATION

(71) Applicant: Google LLC, Mountain View, CA (US)

(72) Inventors: Damien Kelly, San Francisco, CA (US); Bartlomiej Wronski, Santa Monica, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/400,899

(22) Filed: Dec. 29, 2023

(65) Prior Publication Data
US 2024/0137566 A1 Apr. 25, 2024

Related U.S. Application Data

(63) Continuation of application No. 17/529,100, filed on Nov. 17, 2021, now Pat. No. 11,863,791.

(51) Int. Cl.
H04N 19/65 (2014.01)
H04N 19/60 (2014.01)

(52) U.S. Cl.
CPC ............ *H04N 19/65* (2014.11); *H04N 19/60* (2014.11)

(58) Field of Classification Search
CPC ............................... H04N 19/60; H04N 19/65
See application file for complete search history.

(56) References Cited

U.S. PATENT DOCUMENTS

| | | | |
|---|---|---|---|
| 6,567,564 B1 | 5/2003 | van der Wal | |
| 8,908,102 B1 | 12/2014 | Crawford et al. | |
| 2007/0121728 A1 | 5/2007 | Wang et al. | |
| 2007/0236578 A1 | 10/2007 | Nagaraj et al. | |
| 2015/0222818 A1 | 8/2015 | Karpenko | |
| 2016/0112638 A1 | 4/2016 | Shen et al. | |
| 2016/0148648 A1 | 5/2016 | Dimson et al. | |
| 2017/0078574 A1 | 3/2017 | Puntambekar et al. | |
| 2021/0092376 A1 | 3/2021 | Nalci et al. | |

*Primary Examiner* — On S Mung
(74) *Attorney, Agent, or Firm* — Lowenstein Sandler LLP

(57) ABSTRACT

A video item that is subject to one or more motion stabilization transformations applied to the video item is identified. The one or more motion stabilization transformations pertain to a motion between video frames of a video sequence associated with the video item. One or more operations to modify the one or more motion stabilization transformations applied to the video item are determined. The one or more operations to modify the motion stabilization transformations are performed. The video item is provided for playback via a client device. Playback of the video item depicts at least a portion of the motion between the video frames of the video sequence.

20 Claims, 9 Drawing Sheets

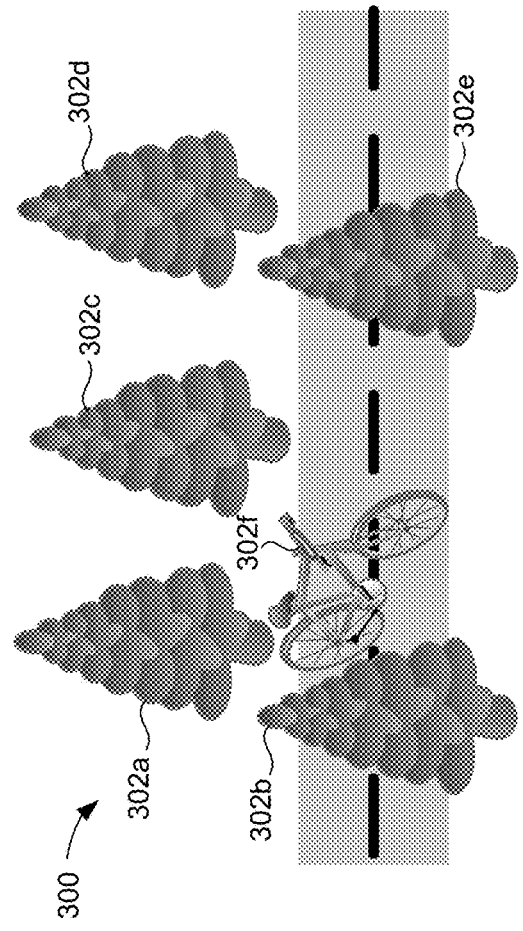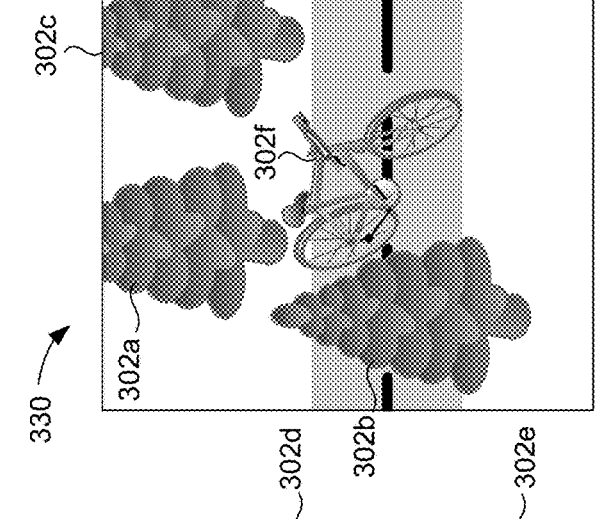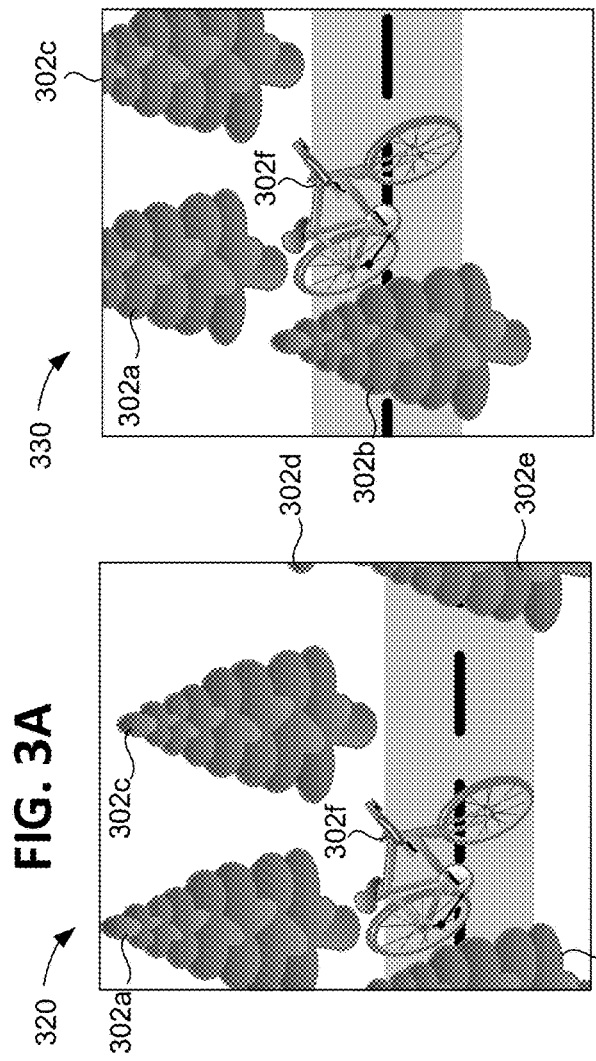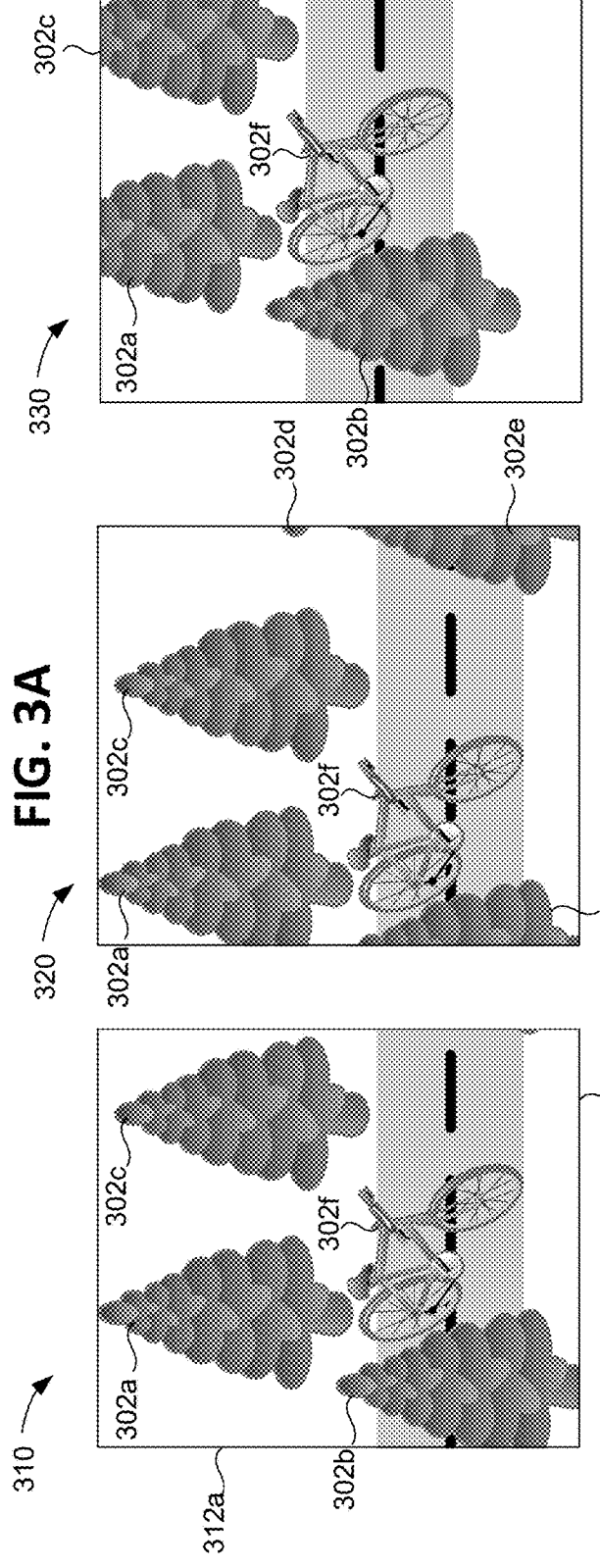

METHODS AND SYSTEMS FOR NON-DESTRUCTIVE STABILIZATION-BASED ENCODER OPTIMIZATION

CROSS-REFERENCE TO RELATED APPLICATIONS

The present application is a continuation of application Ser. No. 17/529,100, filed Nov. 17, 2021, entitled "METHODS AND SYSTEMS FOR NON-DESTRUCTIVE STABILIZATION-BASED ENCODER OPTIMIZATION," which is incorporated by reference herein.

TECHNICAL FIELD

Aspects and implementations of the present disclosure relate to methods and systems for non-destructive, stabilization-based encoder optimization.

BACKGROUND

A platform (e.g., a content sharing platform) can transmit (e.g., stream) media items to client devices connected to the platform via a network. The platform can encode audio signals and/or video signals associated with a media item using an encoder (e.g., a codec) while or before the media item is transmitted to a client device (e.g., to reduce the amount of data transmitted via the network, etc.). The client device can decode the received audio signals and/or video signals using a decoder before the media item is provided to a user associated with the client device (e.g., via a UI of the client device). In some instances, a client device can undergo a significant amount of movement or shaking (e.g., from a user operating the client device) while the client device generates a media item (e.g., a video item). Accordingly, motion can be present between frames (e.g., video frames) of the media item. For example, object(s) can be depicted in a first region of an initial frame of a video sequence and in a second region of a subsequent frame of the video sequence, due to the movement or shaking of the client device while the video item is generated. The platform can apply one or more motion stabilization transformations to correct or reduce the motion before encoding signals associated with the media item (e.g., to improve the efficiency of the encoding process).

SUMMARY

The below summary is a simplified summary of the disclosure in order to provide a basic understanding of some aspects of the disclosure. This summary is not an extensive overview of the disclosure. It is intended neither to identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

In some implementations, a method is disclosed for non-destructive, stabilization-based encoder optimization. The method includes identifying a video item to be provided to one or more users of a platform. The method further includes identifying an indication of a motion between an initial video frame of a video sequence associated with the video item and a subsequent video frame of the video sequence. The method further includes applying one or more motion stabilization transformations to the video item to modify the detected motion between at least the initial frame and the subsequent frame. The method further includes, upon applying the one or more motion stabilization transformations to the video item, encoding the video item. The method further includes transmitting, to a client device connected to the platform, the encoded video item and one or more instructions to cause the client device to reverse the one or more motion stabilization transformations applied to the video item after decoding the encoded video item.

In additional or alternative implementations, a system is disclosed. The system includes a memory device and a processing device coupled to the memory device. The processing device is to perform operations including receiving an encoded video item and a set of instructions to reverse one or more motion stabilization transformations applied to the encoded video item by one or more computing devices associated with a platform. The one or more motion stabilization transformations pertain to motion between two or more of video frames of a video sequence associated with the encoded video item. The operations further include, decoding the encoded video item. The operations further include performing one or more operations to the decoded video item to reverse the one or more motion stabilization transformations in accordance with the obtained set of instructions. The operations further include providing the decoded video item for playback via a client device. A playback of decoded video item depicts the motion between the two or more video frames of the video sequence.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

FIGS. 3A-3D illustrate an example of motion between frames of a media item, in accordance with implementations of the present disclosure.

DETAILED DESCRIPTION

Figure 1:
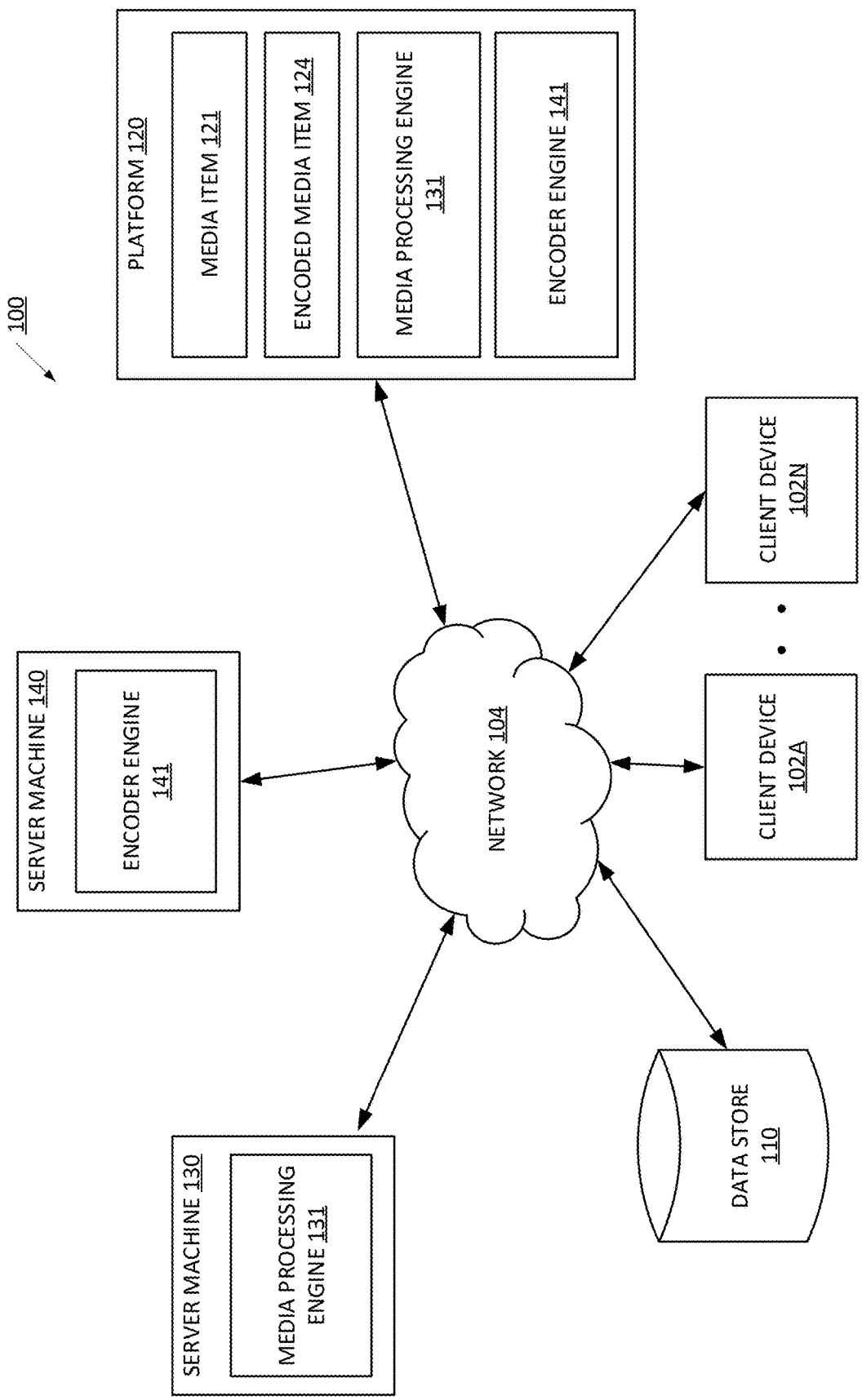
FIG. 1 illustrates an example system architecture, in accordance with implementations of the present disclosure.

Aspects of the present disclosure relate to methods and systems for non-destructive, stabilization-based encoder optimization. A platform (e.g., a content sharing platform, a video conference platform, etc.) can enable a user to access a media item (e.g., a video item, an audio item, etc.) provided by another user of the platform (e.g., via a client device connected to the platform). For example, a client device associated with a first user of a content sharing platform can generate a video item and transmit the video item to the content sharing platform via a network. The content sharing platform can provide a second user with access to the video item by transmitting the video item to a client device associated with the second user (e.g., via a network). In some embodiments, the platform can encode one or more data streams or signals associated with a media item before or while the platform provides access to the media item. For example, an encoder (e.g., a codec) associated with the platform can encode video signals and/or audio signals associated with a video item before or while the platform provides a client device with access to the media item. A decoder residing at a client device that receives the encoded video signals and/or encoded audio signals can decode the received signals before the media item is provided to the user associated with the client device (e.g., via a user interface).

An encoder can be configured to encode one or more data streams or signals associated with a media item to reduce a number of bits that represent data associated with a media item. An encoded data stream or signal can be a compressed version of (e.g., have a smaller size than) the data streams or signals for the media item. In some instances, characteristics associated with a media item can impact a size of an encoded data stream or signal and/or an overall quality of a media item after the encoded data stream or signal is decoded. For example, a first video item hosted by the platform can be generated by a client device that undergoes a significant amount of movement or shaking (e.g., causing a significant amount of motion between video frames of the first video item) as the first video item is generated. A second video item hosted by the platform can be generated by a client device that is still (or approximately still) as the second video item is generated. A size of an encoded data stream or signal associated with the first video item may be larger than a size of an encoded data stream or signal associated with the second video item (e.g., due to the movement or shaking of the client device).

In some systems, a platform can apply one or more motion stabilization transformations to reduce or correct motion between frames of a media item before the media item is encoded. In applying these motion stabilization transformations, the platform can modify the media item by identifying one or more regions of each media item frame that include content that is common throughout each frame and removing (e.g., cropping) regions of each frame that correspond to the motion (e.g., regions at or around the edges of the frames that do not include the common content). Upon removing the regions of each media item frame that correspond to the motion, the platform can apply one or more transformations (e.g., horizontal transformations, vertical transformations, etc.) to align (or approximately align) objects in each region of the modified frames, which can reduce or correct the motion within the media item. The platform can encode a data stream and/or signal associated with the media item and can transmit the encoded data stream and/or signal to a client device, as described above.

As the regions of each media item frame have been removed to generate the modified media item, the modified media item can be smaller and/or less visually complex than the unmodified media item. Accordingly, the encoded data stream and/or signal associated with the media item can be smaller than an encoded data stream and/or signal for the unmodified media item.

Conventional systems that apply motion stabilization transformations to reduce or correct motion between media item frames end up removing a portion of content depicted by the media item (e.g., content depicted in regions of each media frame that correspond to motion across all frames) in order to reduce a size and/or complexity of a media item for encoding. However, the creator of the media item may have intended for the removed content to be included in the media item. Additionally or alternatively, the creator of the media item may have intended that the media item include motion between the media item frames (e.g., in accordance with an artistic vision of the content depicted by the media item). Accordingly, conventional techniques for applying motion stabilization for encoder optimization are destructive to a creator's intent for a media item. Conventional systems do not provide a non-destructive technique for encoding a data stream and/or signal associated with a media item having motion between one or more frames of the media item.

Implementations of the present disclosure address the above and other deficiencies by providing methods and systems for non-destructive, stabilization-based encoder optimization. A platform (e.g., a content sharing platform, a video conference platform, etc.) can host one or more media items (e.g., video items, etc.) to be provided to one or more users of the platform (e.g., via client devices associated with the one or more users). A media item can correspond to a video item, in some embodiments, where the video item includes one or more video frames corresponding to a video sequence. In some embodiments, a client device that generated the video item may have undergone motion or shaking while generating the video item. The platform may detect such motion or shaking between two or more frames of the video item. For example, the platform can determine that one or more objects that are depicted in a first region of an initial video frame of the video sequence associated with the video item are depicted in a second region of a subsequent video frame (e.g., the frame immediately following the initial frame) of the video sequence. The difference (e.g., a locational difference) between the first region of the initial video frame and the second region of the subsequent video frame can correspond to a horizontal translation, a vertical translation, and/or a rotational motion of the one or more objects between the initial video frame and the subsequent video frame (e.g., due to the motion of the client device that generated the video item). Such horizontal translation, vertical translation, and/or rotational motion corresponds to a motion between the initial video frame and the subsequent video frame.

As described above, the platform can detect the motion between the initial video frame and the subsequent video frame (e.g., in response to a request from a client device to access the video item). The platform can, in some embodiments, add pixels adjacent to one or more edges of the initial video frame and/or the subsequent video frame (referred to herein as video frame padding) before applying one or more motion stabilization transformations to correct the motion detected for the video item. Such added pixels can indicate unknown content data associated with the initial video frame and/or the subsequent video frame due to the detected motion. For example, due to the motion or shaking of the client device that generated the video item, one or more regions of the initial video frame can include content that is not depicted in a corresponding region of the subsequent video frame (and vice versa). In one example, the initial video frame and the subsequent video frame can each depict portions of an environment. The content depicted in the initial video frame can be included in a portion of the environment that is not depicted in the subsequent video frame, but is near or adjacent to regions at one or more edges of the subsequent video frame. However, since the subsequent video frame does not depict such portions of the environment, content data for the portion at the time the subsequent video frame was generated is unknown (e.g., to a user consuming the media item). Accordingly, the platform can add pixels to one or more edges of the subsequent video frame that correspond to content of the portion of the environment that is not depicted in the subsequent video frame, but is depicted in a region of the initial video frame. In some embodiments, the platform can pad each video frame of the video item, in accordance with above described embodiments, based on the portions of the environment depicted in each video frame. Further details regarding video frame padding are provided herein.

After padding one or more video frames of the video item, the platform can apply one or more stabilization transformations to the video item to correct the detected motion (e.g., between at least the initial frame and the subsequent frame). To apply the one or more stabilization transformations to the video item, the platform can determine one or more motion offset parameters based on motion parameters indicating the motion between the initial video frame and the subsequent frame. The motion parameters indicating the motion between the initial video frame and the subsequent video frame can include a horizontal translation parameter indicating the horizontal translation of the one or more objects between the first region of the initial video frame and the second region of the subsequent video frame, a vertical translation parameter indicating the vertical translation of the one or more objects between the first region and the second region, and/or a rotational motion parameter indicating the rotational motion of the one or more objects between the first region and the second region. The one or more offset parameters can indicate a horizontal translational motion, a vertical translational motion, and/or a rotational motion to be applied to the initial video frame and/or the subsequent video frame to reduce the motion between the initial video frame and the subsequent video frame. The platform can apply the motion stabilization transformation(s) in view of the determined offset parameters.

In some embodiments, the platform can generate one or more instructions that cause a client device to reverse the one or more motion stabilization transformations that are applied to the video item. The one or more instructions can be generated based on an inverse horizontal translational motion, an inverse vertical translational motion, and/or an inverse rotational motion to be applied to the video item by the client device. The inverse horizontal translational motion, the inverse vertical translational motion, and/or the inverse rotational motion can be inverse motions of the horizontal translational motion, the vertical translational motion, and/or the rotational motion of the one or more motion offset parameters determined for applying the motion stabilization transformation(s). Responsive to generating the one or more instructions, the platform can embed the generated instructions in the video item before the video item is encoded. For example, if a motion stabilization transformation is applied to the subsequent video frame based on one or more motion offset parameters determined based on the motion between the initial video frame and the subsequent video frame, the platform can embed one or more instructions associated with reversing the motion stabilization transformation into the subsequent video frame. Additionally or alternatively, the instructions for multiple video frames can be combined and provided, e.g., as metadata, a separate message, a separate file, etc., for the entire video item.

The platform can encode a data stream and/or a signal associated with the video item (e.g., responsive to applying the one or more motion stabilization transformations to the video item). By applying the motion stabilization transformation(s) to the video item, the motion between video frames of the video item is reduced or corrected, and the video item is, in some embodiments, less complex. In some instances, the encoded data stream and/or signal can be smaller than the stream and/or signal would be, had the motion stabilization transformation(s) not been applied. In other or similar instances, the encoded data stream and/or signal can be the same or a similar size as the stream and/or signal would be without the motion stabilization transformation(s). In such instances, because the motion stabilized video item is less complex, the encoder can encode the data stream and/or signal for the video item using fewer encode bits, which can improve the overall quality (e.g., visual quality) of the encoded video item.

The platform can transmit the encoded data stream and/or signal to a client device connected to the platform. The client device can decode the encoded data stream and/or signal and can obtain the one or more instructions that cause the client device to reverse the motion stabilization transformation(s) applied to the video item. For example, the client device can extract the one or more instructions embedded in the one or more video frames of the video item, or extract the instructions from the metadata of the video item or from the received message or file, as described above. The client device can apply the inverse horizontal translational motion, the inverse vertical translational motion, and/or the inverse rotational motion to one or more video frames of the decoded video item, in accordance with the obtained instructions. By applying the inverse horizontal translational motion, the inverse vertical translational motion, and/or the inverse rotational motion to the one or more video frames, the client device can re-introduce the motion between the video frames. Responsive to applying the inverse motion(s) to the one or more video frames, the client device can provide the video item for playback (e.g., via a media player of the client device). In some embodiments, the client device can remove (e.g., crop) regions from one or more video frames that include the pixels added (e.g., in accordance with the video frame padding) by the platform. By padding the initial video frame and the subsequent video frame before applying the motion stabilization transformation(s), the client device only removes the pixels added to the video frames by the platform and no content depicted in the video frames is removed (e.g., cropped) as the motion stabilization transformation(s) are reversed.

Aspects of the present disclosure provide a non-destructive mechanism for stabilization-based encoder optimization. By padding one or more frames of a media item based on the motion between the frames, a computing system (e.g., a platform) can retain content that is included in each frame that is not common content across all frames of the media item sequence when the motion stabilization transformation(s) are applied. Additionally, this mechanism provides that the client device can reverse the motion stabilization transformation(s) that are applied to the media item after the data stream and/or signal is decoded at the client device. In view of the above, the user associated with the client device can consume the media item as intended by the creator of the video item. Further, embodiments of the present disclosure enable the computing system to improve data stream and/or signal compression by an encoder without modifying (e.g., destroying) content depicted by a media item (e.g., removing a portion of the content, removing the motion between frames of the media item, etc.). By applying one or more motion stabilization transformations to the media item, the system reduces a complexity of the media item prior to encoding. In some instances, a size of the encoded data stream and/or signal for the media item can be reduced. In other or similar instances, the complexity of the media item is reduced, which enables the encoder to encode the data stream and/or signal more efficiently, which can improve an overall quality (e.g., visual quality) of the media item upon playback at a client device. By reducing the complexity of the media item prior to encoding, fewer computing resources are consumed during the encoding process, and such computing resources are available for other processes associated with the platform. Accordingly, an overall efficiency of the computing system is increased.

FIG. 1 illustrates an example system architecture 100, in accordance with implementations of the present disclosure. The system architecture 100 (also referred to as "system" herein) includes one or more client devices 102A-N, a data store 110, a platform 120 (e.g., a content sharing platform, a conference platform, etc.), and one or more server machines 130-140, each connected to a network 104. In implementations, network 104 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof.

In some implementations, data store 110 is a persistent storage that is capable of storing data as well as data structures to tag, organize, and index the data. A data can include one or more media items, in some embodiments, where each media item includes audio data and/or video data, in accordance with embodiments described herein. Data store 110 can be hosted by one or more storage devices, such as main memory, magnetic or optical storage based disks, tapes or hard drives, NAS, SAN, and so forth. In some implementations, data store 110 can be a network-attached file server, while in other embodiments data store 110 can be some other type of persistent storage such as an object-oriented database, a relational database, and so forth, that may be hosted by platform 120 or one or more different machines (e.g., server machines 130-140) coupled to the platform 120 via network 104.

Client devices 102A-N can include one or more computing devices such as personal computers (PCs), laptops, mobile phones, smart phones, tablet computers, netbook computers, network-connected televisions, etc. In some implementations, a client device 102 can also be referred to as a "user device." Client devices 102A-N can include a content viewer. In some implementations, a content viewer can be an application that provides a user interface (UI) for users to view or upload content, such as images, video items, web pages, documents, etc. For example, the content viewer can be a web browser that can access, retrieve, present, and/or navigate content (e.g., web pages such as Hyper Text Markup Language (HTML) pages, digital media items, etc.) served by a web server. The content viewer can render, display, and/or present the content to a user. The content viewer can also include an embedded media player (e.g., a Flash® player or an HTML5 player) that is embedded in a web page (e.g., a web page that may provide information about a product sold by an online merchant). In another example, the content viewer can be a standalone application (e.g., a mobile application or app) that allows users to view digital media items (e.g., digital video items, digital images, electronic books, etc.). According to aspects of the disclosure, the content viewer can be a content sharing platform application for users to record, edit, and/or upload content for sharing on platform 120. As such, the content viewers can be provided to client devices 102A-N by platform 120. For example, the content viewers may be embedded media players that are embedded in web pages provided by the platform 120.

A media item 121 can be consumed via the Internet or via a mobile device application, such as a content viewer of client devices 102A-N. In some embodiments, a media item 121 can correspond to a media file (e.g., a video file, an audio file, a video stream, an audio stream, etc.). In other or similar embodiments, a media item 121 can correspond to a portion of a media file (e.g., a portion or a chunk of a video file, an audio file, etc.). As discussed previously, a media item 121 can be requested for presentation to the user by the user of the platform 120. As used herein, "media," "media item," "online media item," "digital media," "digital media item," "content," and "content item" can include an electronic file that can be executed or loaded using software, firmware or hardware configured to present the digital media item to an entity. As indicated above, the platform 120 can store the media items 121, or references to the media items 121, using the data store 110, in at least one implementation. In another implementation, the platform 120 can store media item 121 or fingerprints as electronic files in one or more formats using data store 110. Platform 120 can provide media item 121 to a user associated with a client device 102A-N by allowing access to media item 121 (e.g., via a content sharing platform application), transmitting the media item 121 to the client device 102, and/or presenting or permitting presentation of the media item 121 via client device 102.

In some embodiments, media item 121 can be a video item. A video item refers to a set of sequential video frames (e.g., image frames) representing a scene in motion. For example, a series of sequential video frames can be captured continuously or later reconstructed to produce animation. Video items can be provided in various formats including, but not limited to, analog, digital, two-dimensional and three-dimensional video. Further, video items can include movies, video clips, video streams, or any set of images (e.g., animated images, non-animated images, etc.) to be displayed in sequence. In some embodiments, a video item can be stored (e.g., at data store 110) as a video file that includes a video component and an audio component. The video component can include video data that corresponds to one or more sequential video frames of the video item. The audio component can include audio data that corresponds to the video data.

Platform 120 can include multiple channels (e.g., channels A through Z). A channel can include one or more media items 121 available from a common source or media items 121 having a common topic, theme, or substance. Media item 121 can be digital content chosen by a user, digital content made available by a user, digital content uploaded by a user, digital content chosen by a content provider, digital content chosen by a broadcaster, etc. For example, a channel X can include videos Y and Z. A channel can be associated with an owner, who is a user that can perform actions on the channel. Different activities can be associated with the channel based on the owner's actions, such as the owner making digital content available on the channel, the owner selecting (e.g., liking) digital content associated with another channel, the owner commenting on digital content associated with another channel, etc. The activities associated with the channel can be collected into an activity feed for the channel. Users, other than the owner of the channel, can subscribe to one or more channels in which they are interested. The concept of "subscribing" may also be referred to as "liking," "following," "friending," and so on.

In some embodiments, system 100 can include one or more third party platforms (not shown). In some embodiments, a third party platform can provide other services associated media items 121. For example, a third party platform can include an advertisement platform that can provide video and/or audio advertisements. In another example, a third party platform can be a video streaming service provider that produces a media streaming service via a communication application for users to play videos, TV shows, video clips, audio, audio clips, and movies, on client devices 102 via the third party platform.

In some embodiments, a client device 102 can transmit a request to platform 120 for access to a media item 121. In some embodiments, the requested media item 121 may have been generated by another client device 102 connected to platform 120. For example, client device 102A can generate a video item (e.g., via an audiovisual component, such as a camera, of client device 102A) and provide the generated video item to platform 120 to be accessible by other users of the platform. Client device 102N can transmit the request to platform 120 to access the video item generated by client device 102A. Encoder engine 141 of platform 120 can encode one or more data streams or signals associated with media item 121 before or while platform 120 provides client device 102N with access to the requested media item 121. Encoder engine 141 can include one or more encoders (e.g., codecs) that encode a data stream or signal in accordance with a set of encoder parameter settings. In some embodiments, an encoder can include one or more devices at or coupled to a processing device associated with encoder engine 151. In other or similar embodiments, an encoder can correspond to a software program running on a processing device associated with the platform, or another processing device that is connected to a processing device associated with encoder engine 141 (e.g., via network 104). The encoder can be configured to encode one or more data streams or signals associated with a media item 121 to create one or more encoded data streams or signals. The encoder can encode the data streams or signals by restructuring or otherwise modifying the one or more data streams or signals to reduce a number of bits configured to represent data associated with a media item 121.

Encoder engine 141 can encode one or more data streams or signals associated with a requested media item 121 (represented as encoded media item 124, as illustrated in FIG. 1), in accordance with embodiments provided herein, and platform 120 can transmit the encoded media item 124 to client device 102. In some embodiments, client device 102 can include, or be coupled to, an encoder and/or a decoder that is configured to decode an encoded data stream or signal. Client device 102 can provide the one or more encoded data streams or signals associated with encoded media item 124 as input to the encoder and/or the decoder, which can decode the one or more encoded data streams or signals. The one or more decoded data streams or signals can correspond to requested media item 121. Client device 102 can provide requested media item 121 to a user associated with client device 102 based on the one or more decoded data streams or signals associated with requested media item 121 (e.g., via a UI of client device 102).

In some embodiments, client device 102A can generate media item 121 while undergoing motion or shaking. Accordingly, motion can be present between two or more frames (e.g., video frames) of media item 121. Motion between at least two frames of media item 121 refers to a horizontal distance, a vertical distance, and/or a rotational difference between regions of two or more frames depicting common objects. For example, an initial video frame and a subsequent video frame of a video item can depict one or more common objects. The objects can be depicted in a first region of the initial video frame and in a second region of the subsequent video frame. The horizontal distance, the vertical distance, and/or the rotational difference between the first region and the second region corresponds to a motion or shaking of the client device 102A when the video item was generated. Accordingly, the horizontal distance, the vertical distance, and/or the rotational difference between the first region and the second region corresponds to a motion (i.e., of the objects) between the initial frame and the subsequent frame.

Before the media item 121 is encoded by encoder engine 141 (and transmitted to client device 102N in response to a request), media processing engine 131 can apply one or more motion stabilization transformations to media item 121 to correct or reduce the motion between frames of media item 121. A motion stabilization transformation refers to a transformation applied to one or more frames of the media item 121 to correct the horizontal distance, the vertical distance, and/or the rotational difference between regions of the frames depicting common objects. For example, media processing engine 131 can apply at least one of a horizontal translation transformation, a vertical translation transformation, or a rotational transformation to cause the second region of the subsequent video frame depicting the common objects to align (or approximately align) with the first region of the initial video frame depicting the common objects. Further details regarding applying motion stabilization transformation(s) to frames of media item 121 are provided herein. By aligning (or approximately aligning) the second region of the subsequent video frame with the first region of the initial video frame, objects depicted in the initial video frame and the subsequent video frame are approximately in the same region of each frame of media item 121. Accordingly the motion between the initial frame and the subsequent frame of media item 121 is corrected or reduced and a complexity (e.g., a visual complexity) associated with media item 121 is reduced. As the complexity associated with the media item 121 is reduced, the encoder of encoding engine 141 can more efficiently encode a data stream and/or signal associated with media item 121 than if the encoder encoded a data stream and/or signal associated with the media item 121 without the applied transformation(s). Further, in some instances, the encoded data stream and/or signal associated with media item 121 can be smaller than a data stream and/or signal associated with the media item 121 without the applied transformation(s).

In some embodiments, media processing engine 131 can apply padding to one or more edges of each video frame of media item 121. Media processing engine 131 can apply the padding before (e.g., or after) the motion stabilization transformation(s) are applied to media item 121. Video item padding refers to additional pixels added to one or more edges of a frame that corresponds to unknown content data associated with the environment and/or objects depicted in the frame. For example, the initial video frame and the subsequent video frame can depict portions of an environment. Content depicted in the initial video frame can be included in a portion of the environment that is not depicted in the subsequent video frame, but is near or adjacent to regions at one or more edges of the subsequent video frame. Since the subsequent video frame does not depict such portions of the environment, content data for the portion of the environment at the time the subsequent video frame was generated is unknown. Media processing engine 131 can add pixels to one or more edges of the subsequent video frame that correspond to content of the portion of the environment that is not depicted in the subsequent video frame, but is depicted in a region of the initial video frame.

To apply a motion stabilization transformation to a frame of media item 121, media processing engine 131 can determine one or more motion offset parameters based on motion parameters indicating the motion between the frame and one or more additional frames (e.g., a prior frame, a subsequent frame, etc.) of media item 121. The motion parameters can indicate a horizontal motion (i.e., a horizontal translation), a vertical motion (i.e., a vertical translation), a rotational motion present between two or more frames of media item 121, a rolling shutter motion present within a frame of media item 121, a parallax motion present within a frame of media item 121, etc. The motion offset parameters can include a horizontal translational motion, a vertical translational motion, a rotational motion, a skew motion, a shear motion, etc., to be applied to the frame to reduce the motion between the frame and the one or more additional frames. The media processing engine 131 can apply one or more transformations to the frame based on the determined offset parameters to cause a region of the frame depicting common objects to align (or approximately align) with regions of the one or more additional frames that depict the common objects, as described above.

In some embodiments, media processing engine 131 can generate a set of instructions that cause the client device 102 that obtains access to a respective media item 121 (e.g., client device 102N) to reverse the motion stabilization transformation(s) applied to media item 121. The instructions can include an indication of one or more inverse motions that are to be applied to the video frames by client device 102N to reverse the transformation(s) applied to the video frames. For example, if the transformation(s) applied to a frame of media item 121 includes a translating objects depicted in the frame a particular number of pixels in a particular direction, the set of instructions can include an indication that the reverse the transformation(s), the client device is to translate the depicted objects the particular number of pixels in the opposite direction. In some embodiments, media processing engine 131 can generate the set of instructions based on the transformation(s) applied to media item 121 and can include the generated set of instructions with media item 121. For example, for each frame that media processing engine 131 applies a motion stabilization transformation, media processing engine 131 can embed one or more instructions associated with reversing the transformation into the video frame. In such example, encoder engine 141 can encode data streams and/or signals associated with the media item 124, as described above, where the data streams and/or signals include the embedded instructions.

As described above, platform 120 can transmit encoded media item 124 to client device 102N (e.g., in response to a request from client device 102N). A media playback engine residing at client device 102N can include one or more decoders configured to decode encoded media item 124, as described above. The decoded media item can correspond to media item 121. The media playback engine can obtain the set of instructions associated with reversing the motion stabilization transformation(s) applied to media item 121 (e.g., by extracting the instructions for each frame of media item 121). The media playback engine can execute the set of instructions to reverse the motion stabilization transformation(s) and can provide the media item 121 for playback via client device 102N. In some embodiments, by reversing the motion stabilization transformation(s), the media playback engine can remove (e.g., crop) the pixels added to the edges of one or more frames of media item 121 by media processing engine 131. Further details regarding the media playback engine are provided herein.

In some implementations, platform 120 and/or server machines 130-140 can operate on one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to enable a user to connect with other users via a conference call. In some implementations, the functions of platform 120 and/or server machines 130-140 may be provided by a more than one machine. For example, in some implementations, the functions of media processing engine 131 and/or encoding engine 141 may be provided by two or more separate server machines. Content sharing platform 120 and/or server machines 130-140 may also include a website (e.g., a webpage) or application back-end software that may be used to enable a user to connect with other users via the conference call.

In general, functions described in implementations as being performed by platform 120 can also be performed on the client devices 102A-N in other implementations, if appropriate. In addition, the functionality attributed to a particular component can be performed by different or multiple components operating together. Platform 120 can also be accessed as a service provided to other systems or devices through appropriate application programming interfaces, and thus is not limited to use in websites.

It should be noted that although some embodiments of the present disclosure are directed to a content sharing platform, embodiments of this disclosure can be applied to other types of platforms. For example, embodiments of the present disclosure can be applied to a content archive platform, a content storage platform, a conference platform, etc.

In implementations of the disclosure, a "user" can be represented as a single individual. However, other implementations of the disclosure encompass a "user" being an entity controlled by a set of users and/or an automated source. For example, a set of individual users federated as a community in a social network can be considered a "user." In another example, an automated consumer can be an automated ingestion pipeline, such as a topic channel, of the platform 120.

In situations in which the systems discussed here collect personal information about users, or can make use of personal information, the users can be provided with an opportunity to control whether platform 120 collects user information (e.g., information about a user's social network, social actions or activities, profession, a user's preferences, or a user's current location), or to control whether and/or how to receive content from the content server that can be more relevant to the user. In addition, certain data can be treated in one or more ways before it is stored or used, so that personally identifiable information is removed. For example, a user's identity can be treated so that no personally identifiable information can be determined for the user, or a user's geographic location can be generalized where location information is obtained (such as to a city, ZIP code, or state level), so that a particular location of a user cannot be determined. Thus, the user can have control over how information is collected about the user and used by the platform 120.

Figure 2:
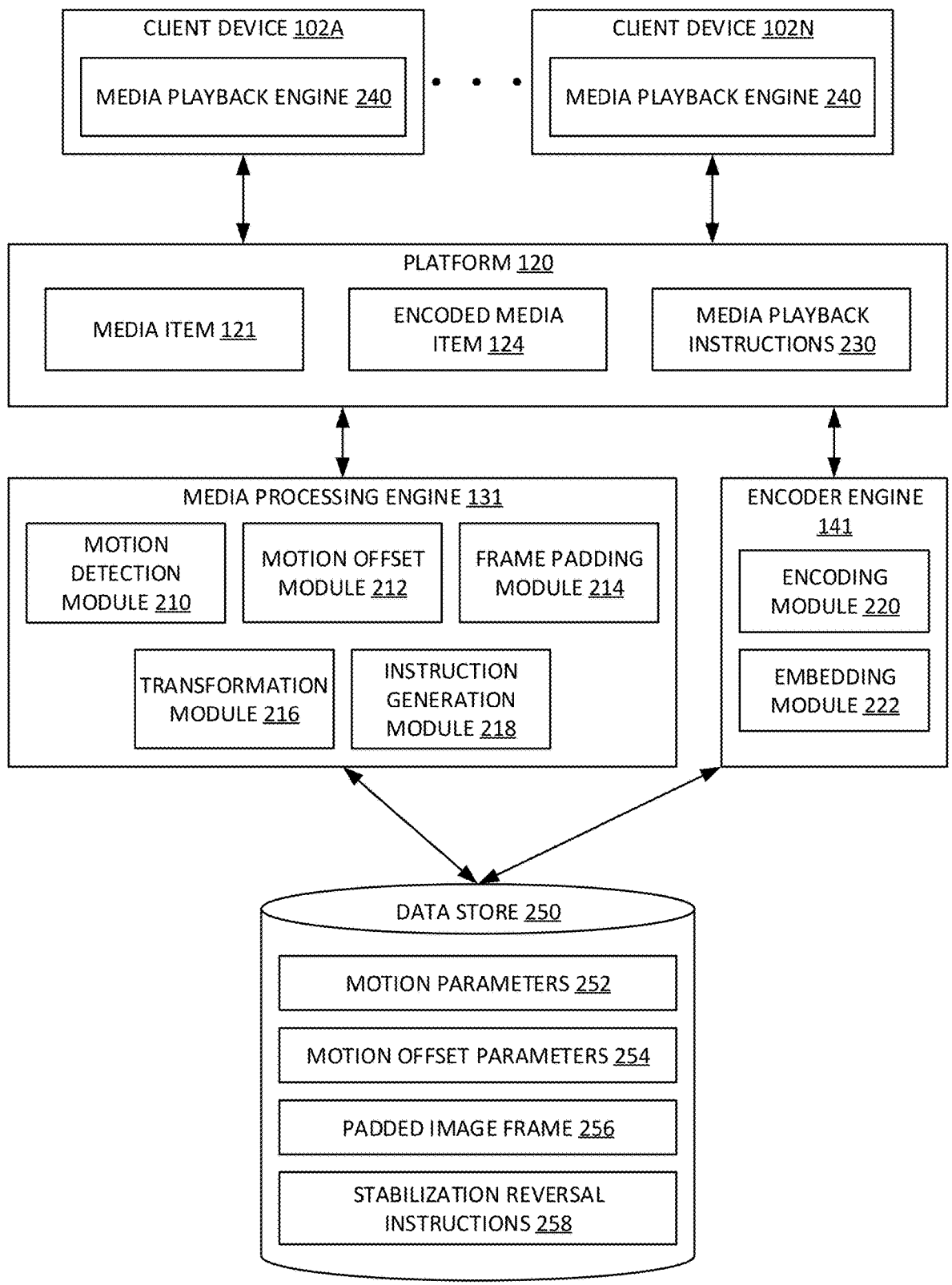
FIG. 2 is a block diagram illustrating a platform, a media processing engine, and an encoder engine, in accordance with implementations of the present disclosure.

FIG. 2 is a block diagram illustrating a platform 120, a media processing engine 131, and an encoder engine 141, in accordance with implementations of the present disclosure. In some embodiments, media processing engine 131, encoder engine 141, and/or platform 120 can be connected to data store 250. Data store 250 can correspond to data store 110, in some embodiments. In additional or alternative embodiments, data store 250 can correspond to another data store accessible by media processing engine 131, encoder engine 141, and/or platform 120 (e.g., via network 104 and/or another network).

As described with respect to FIG. 1, platform 120 can enable a user to access a media item 121 (e.g., a video item) provided by another user of platform 120. For example, a client device 102A (e.g., associated with a first user) can generate a media item 121 (e.g., via an audiovisual component, such as a camera, at or coupled to client device 102A). Client device 102A can transmit media item 121 to platform 120 (e.g., via network 104). Platform 120 can provide client device 102N with access to the media item 121, in accordance with embodiments described herein.

In response to platform 120 receiving media item 121 from client device 102A, motion detection module 210 of media processing engine 131 can detect motion between two or more frames of media item 121. As described above, motion between two or more frames can correspond to a horizontal, vertical, and/or rotational difference between regions of the two or more frames depicting common objects. FIG. 3A illustrates an example environment 300, in accordance with implementations of the present disclosure. Environment 300 can include one or more objects 302. For example, as illustrated in FIG. 3A, environment 300 can include a first object 302a (e.g., a first tree), a second object 302b (e.g., a second tree), a third object 302c (e.g., a third tree), a fourth object 302d (e.g., a fourth tree), a fifth object 302e (e.g., a fifth tree), and/or a sixth object 302f (e.g., a bicycle). In some embodiments, client device 102A can generate a media item (e.g., a video item) depicting one or more portions of environment 300, as described above.

FIGS. 3B-3D illustrate example frames 310-330 of the video item generated by client device 102A. Client device 102A can generate frames 320 and/or 330 at different times than frame 310. For example, frames 310-330 can correspond to a video sequence of the video item. In one example, frame 310 can be an initial frame of the sequence, frame 320 can be subsequent to frame 310 in the sequence, and frame 330 can be subsequent to frame 320 in the sequence. It should be noted that although frame 310 is referred to herein as an initial frame of the sequence and frames 320 and 330 are referred to as subsequent frames of the sequence frames 310-330 can correspond to a different sequence. For example, frame 320 can be an initial frame of the sequence and frames 310 and 330 can be subsequent frames of the sequence, etc. It should also be noted that a video sequence of a video item described herein refers to any sequence of frames associated with the video item. Accordingly, an initial frame of the sequence can refer to a first frame generated for the video item (e.g., when the client device 102A initiates generation of the video item) or any other frame that is generated before other frames of the video item. Additionally, a subsequent frame of the sequence can refer to a last frame generated for the video item (e.g., right before the client device 102A terminates generation of the video item) or any other frame that is generated after another frame of the video item.

As illustrated in FIG. 3B, frame 310 can depict one or more objects 302 included in environment 300. For example, as illustrated in FIG. 3B, a first region of frame 310 can depict object 302a of environment 300, a second region of frame 310 can depict object 302c of environment 300, and a third region of frame 310 can depict object 302f of environment 300. A fourth region of frame 310 can depict a portion of object 302b. The portion(s) of object 302b not depicted in frame 310 can be included in locations of environment 300 that are not captured in frame 310. Such locations correspond to a region at or adjacent to a region of a first edge (e.g., edge 312a) and a second edge (e.g., edge 312b) of frame 310. Frame 320 of FIG. 3C can depict the same and/or different objects 302 than are depicted in frame 310. For example, as illustrated in FIG. 3C, a first region of frame 320 can depict object 302c and a second region of frame 320 can depict object 302f of environment 300. A third region of frame 320 can depict a portion of object 302a, a fourth region of frame 320 can depict a portion of object 302b. In addition, a fifth region of frame 320 can depict a portion of object 302d (i.e., not depicted in frame 310) and a sixth region of frame 320 can depict a portion of object 302e (i.e., also not depicted in frame 310). The portions of objects 302a, 302b, 302d, and/or 302e that are not depicted in frame 320 can be included in locations of environment 300 that are not captured in frame 320. Such locations correspond to one or more regions at or adjacent to regions of one or more edges of frame 320, as described above. Frame 320 of FIG. 3D can depict the same and/or different objects 302 than are depicted in frames 310 and/or 320. For example, as illustrated in FIG. 3D, a first region of frame 330 can depict object 302b and a second region of frame 330 can depict object 302f. A third region of frame 330 can depict a portion of object 302a and a fourth region of frame 330 can depict a portion of object 302c. The portions of object 302a and/or 302c that are not depicted in frame 320 can be included in locations of environment 300 that correspond to regions at or adjacent to regions at one or more edges of frame 330, as described above.

As illustrated in FIGS. 3B-3D, one or more objects 302 of environment 300 are depicted in different regions (or may not be depicted) across frames 310-330. For example, the first region of frame 310 that depicts object 302a is different from the third region of frame 320 that depicts a portion of object 302a. The first region of frame 310 and the third region of frame 320 that depict object 302a are different from the third region of frame 330 that depicts a portion of object 302a. The difference between the regions that depict, for example, object 302a across frames 310-330 can correspond to a movement or shaking by client device 102A (or an audiovisual component connected to client device 102A) while client device 102A generated the video item including frames 310-330. For example, between generating frames 310 and 320, the client device 102A may have moved slightly to the right, as indicated by frame 320 depicting a portion of object 302a compared to frame 310 depicting all of object 302a. Such movement corresponds to a horizontal translation of object 302a across frames 310 and 320. In another example, between generating frames 320 and 330, client device 102A may have moved to the left and down, as indicated by frame 330 depicting a different portion of object 302a compared to the portion of object 302a depicted in frame 320. Such movement corresponds to a horizontal translation and a vertical translation of object 302a across frames 310 and 320. The difference between the regions depicting common objects (e.g., object 302a, etc.) across frames 310-330 correspond to the movement or shaking of client device 102A as the video item is generated. Such a difference is referred to herein as a movement or motion between frames of the video item.

Referring back to FIG. 2, as described above, motion detection module 210 of media processing engine 131 can detect motion between two or more frames of media item 121. In some embodiments, motion detection module 210 can detect the motion between the frames by determining one or more motion parameters 252 associated with an initial frame of a video sequence and a subsequent frame of the video frame sequence. The motion parameters 252 can be determined in view of a difference between a first region of the initial frame that depicts one or more objects and a second region of the subsequent frame that depicts the one or more objects. The motion parameters can include a horizontal translation parameter indicating a horizontal motion or translation of the one or more objects between the first region of the initial frame and the second region of the subsequent frame (e.g., the horizontal translation of object 302a between the first region of frame 310 and the third region of 320), a vertical translation parameter indicating a vertical motion or translation of the one or more objects between the first region of the initial frame and the second region of the subsequent frame (e.g., the vertical translation of object 302a between the third region for frame 320 and the third region of frame 330), a rotational motion parameter indicating a rotational motion of the one or more objects between the first region of the initial video frame and a second region of the subsequent video frame, a rolling shutter motion parameter indicating a wobble or shaking motion present within the initial video frame and/or the subsequent video frame, a parallax motion parameter indicating a visual displacement of the one or more objects between the first region of the initial video frame and the second region of the subsequent video frame, etc. It should be noted that the motion parameter(s) can include other parameters indicating other types of affine motions between the initial video frame and the second video frame. In some embodiments, motion detection module 210 can store the determined motion parameters in data store 250, as illustrated in FIG. 2.

Motion offset module 212 of media processing engine 131 can determine one or more motion offset parameters 254 for one or more motion stabilization transformation(s) applied to the frames of media item 121, in some embodiments. A motion offset parameter 254 indicates a horizontal translational motion, a vertical translational motion, a rotational motion, a skew transformation, and/or a shear transformation to be applied to one or more frames to reduce or correct the motion between frames of media item 121. In some embodiments, motion offset module 212 can determine the one or more motion offset parameters 254 based on the determined motion parameters 252 at data store 250. For example, a first motion parameter 252 determined by motion detection module 210 can correspond to a distance and/or direction that client device 102a had moved between generating frame 310 and frame 320. Motion offset module 212 can determine, based on the first motion parameter 252, a directional distance between the first region of frame 310 that depicts object 302a and the third region of frame 320 that depicts object 302a, as described above. Motion offset module 212 can determine, in one illustrative example, that the first region of frame 310 is located 10 pixels from a left edge of frame 310 and the third region of frame 320 is located 5 pixels from the left edge of frame 310. Accordingly, the third region of frame 320 is 5 pixels to the left of the first region of frame 310. Motion offset module 212 can determine that to align the third region of frame 320 to the first region of frame 310, objects 302 depicted in frame 320 are to be shifted to the right a distance of 5 pixels. A first motion offset parameter 254 corresponding to the first motion parameter 252 can indicate the direction (e.g., to the right) and the distance (e.g., 5 pixels) that objects 302 are to be shifted (e.g., corresponding to a horizontal translational motion, as described above). In some embodiments, motion offset module 212 can determine a corresponding motion offset parameter 254 for each motion parameter 252 determined by motion detection module 210. In other or similar embodiments, motion offset module 212 can determine an average motion or an aggregate motion between the frames of media item 121 (e.g., based on one or more motion parameters 252) and determine corresponding motion offset parameters 254 indicating an aggregate or average offset motion to reduce or correct the average or aggregate motion.

Frame padding module 214 can be configured to pad one or more frames of media item 121, as described above. As described previously, frame padding refers to adding additional pixels to regions adjacent to one or more edges of a frame. The added pixels can correspond to unknown content data associated with the environment captured by a respective frame. As described with respect to FIGS. 3B-3D, one or more portions of objects 302 of environment 300 can be depicted in regions of frames 310-330 that are adjacent to one or more edges of frames 310-330. Accordingly, one or more portions of such objects may not be depicted in frames 310-330. Pixels added to edges of frames 310 can correspond to the one or more portions of such objects that are not depicted in frames 310-330, but are present in environment 300. Further details regarding padding frames 310-330 are provided below.

Figure 4:
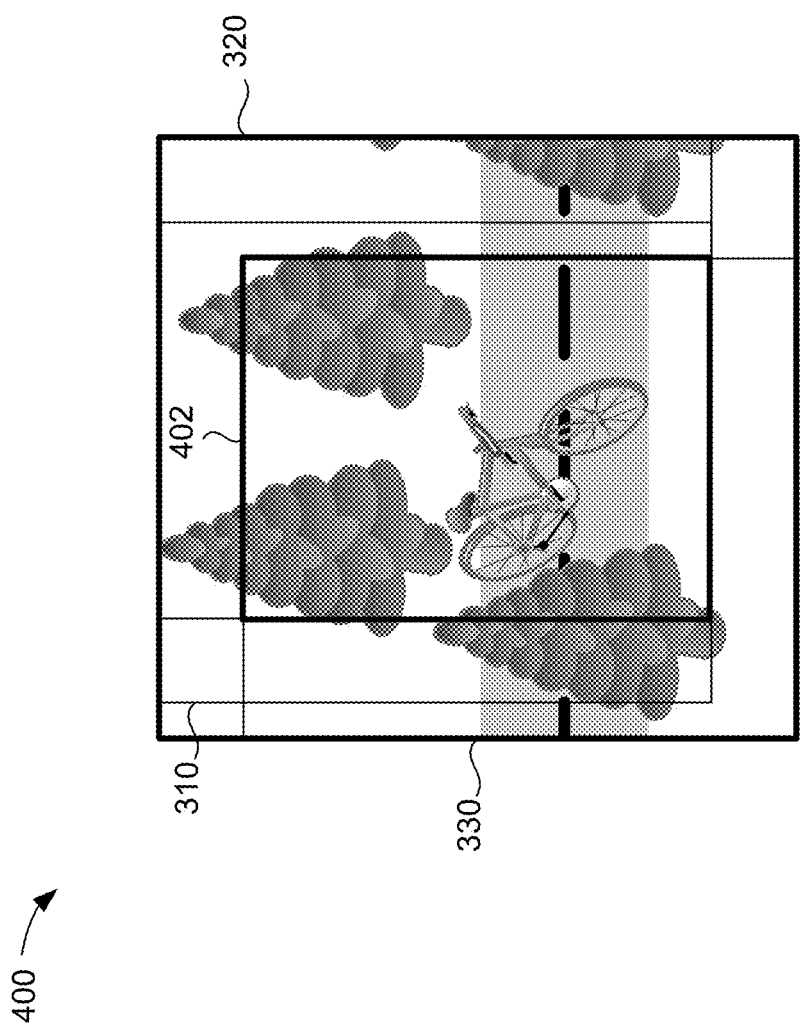
FIG. 4 illustrates an example of identifying portions of an environment depicted by a media item for padding of the media item, in accordance with implementations of the present disclosure.

FIG. 4 illustrates an example of identifying portions of an environment depicted by a media item for padding, in accordance with implementations of the present disclosure. In some embodiments, frame padding module 214 can identify a global motion region 400 based on the locations of environment 300 that are depicted by frames 310-330. The global motion region 440 can correspond to a portion or location of environment 300 that is depicted by at least one of frames 310-330. For example, FIG. 4 illustrates an overlap of portions or locations of environment 300 that are depicted in frames 310-330. As illustrated in FIG. 4, only objects 302 that are included in location 402 are depicted in each of frames 310-330 (e.g., a portion of object 302a, a portion of object 302b, a portion of object 302c, and object 302f). However, objects 302 of environment 300 that are not included in location 402 are depicted in at least one of frames 310-330. For example, a portion of objects 302d and 302e are depicted in frame 320. Additionally, portions of objects 302a, 302b, and 302c (i.e., which are not included in location 402 of environment 300) are depicted in respective frames 310-330, as illustrated in FIGS. 3B-3D. Frame padding module 314 can identify the global motion region 400 based on each portion or location of environment 300 that is depicted by at least one of frames 310. The global motion region 400 can include location 402, as well as other locations of environment 300 that are not included in location 402 but are otherwise depicted in at least one of frames 310-330.

Figure 5A:
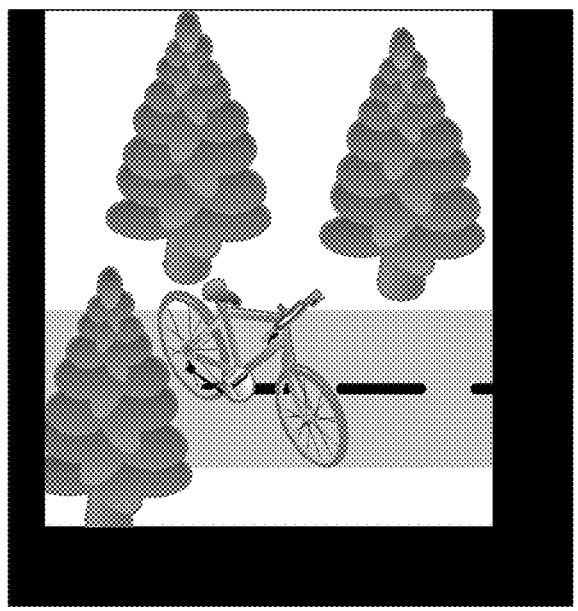
FIGS. 5A-5C illustrate an example of padding one or more frames of a media item, in accordance with implementations of the present disclosure.
Figure 5B:
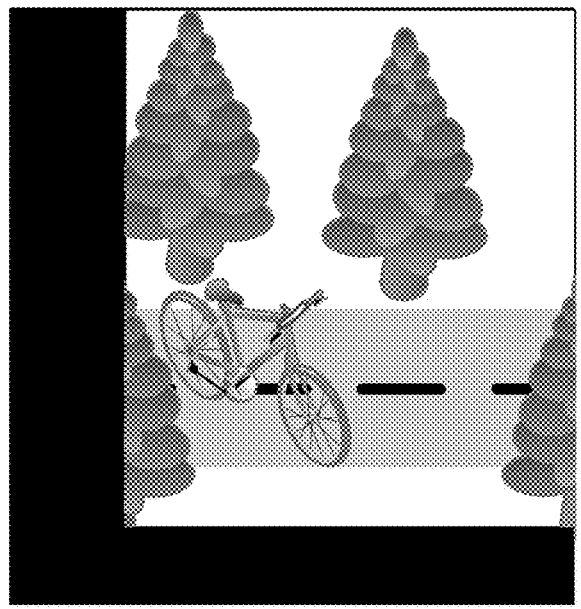
Figure 5C:
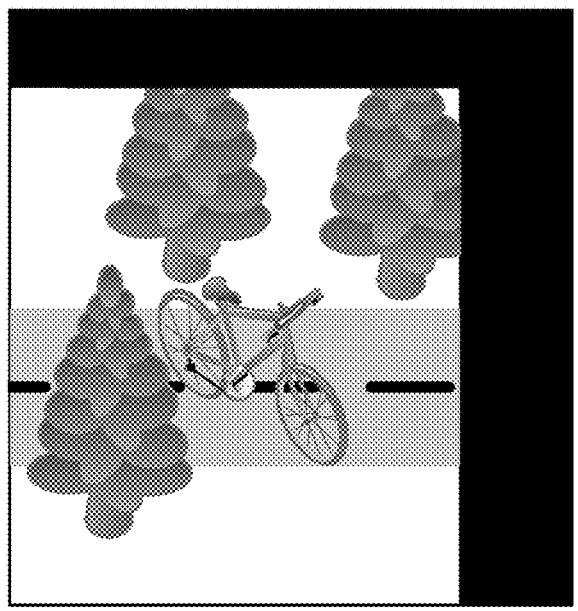

Frame padding module 214 can add pixels to one or more edges of frames 310-330 based on global motion region 400. FIGS. 5A-5C illustrate example pixels added to frames 310-330 by frame padding module 214. In an illustrative example, the location of environment 300 that is depicted by frame 310 can be a portion of global motion region 400. As illustrated in FIG. 5A, frame padding module 214 can modify frame 310 (i.e., to generate modified frame 510) by adding pixels to the edges of frame 310 that include the portions of global motion region 400 that are not depicted in frame 310. The portions of global motion region 400 that are not depicted in frame 310 correspond to objects in environment 300 which are not captured by frame 310 (but are captured by frame 320 and/or 330). Accordingly, the portions of global motion region 400 that are not depicted in frame 310 indicate unknown content data with respect to frame 310. In some embodiments, the pixels added to the edge(s) of frame 310 can indicate that the content data of the portions of global motion region 400 not depicted in frame 310 is unknown or invalid. For example, the pixels added to the edge(s) of frame 310 can be black pixels, as illustrated in FIG. 5A. Frame padding module 314 can modify frames 320 and/or 330 by adding pixels to edge(s) of frames 320 and/or 330 to generate modified frames 520 and/or 530, in accordance with previously described embodiments, as illustrated in FIGS. 5B-5C. In response to generating modified frames 510, 520, and/or 530, frame padding module 214 can store the modified frames at data store 250 (e.g., as padded image frames 256).

It should be noted that some embodiments of the present disclosure are directed to adding pixels to one or more edges of a frame of a media item 121 (e.g., frames 310-330 described above). However, other methods can be used to increase a number of pixels of one or more frames of a media item 121. For example, one or more modules of media processing engine 131 can apply one or more image in-painting techniques (i.e., techniques to fill missing portions of an image) to frame(s) of media item 121, in some embodiments. In some embodiments, the one or more image in-painting techniques can be machine learning techniques that implement one or more trained machine learning models. The image in-painting techniques can increase a resolution (i.e., a number of pixels per frame) of media item 121, in some embodiments.

Referring back to FIG. 2, transformation module 216 can apply one or more motion stabilization transformations to media item 121 to reduce or correct motion between frames of media item 121. In some embodiments, transformation module 216 can apply the motion stabilization transformation(s) in view of the motion offset parameters 254 determined by motion offset module 212, as described above. For example, if a first motion offset parameter 254 indicates that to offset a motion of objects depicted in frames 310 and 320, objects of frame 320 are to be shifted approximately 5 pixels to the right, transformation module 216 can modify frame 320 to shift the depicted objects, in accordance with the first motion offset parameter 254. In some embodiments, transformation module 216 can apply the one or more motion stabilization transformations to padded image frames 256 (i.e., generated by frame padding module 214 as described above). It should be noted that although some embodiments of the present disclosure are directed to reducing motion between frames of media item 121, motion can be introduced or added between frames of the media item, in accordance with embodiments of the present disclosure. For example, motion detection module 210 can, in some embodiments, detect one or more jumps or discontinuities (e.g., of a position, etc.) of one or more objects between frames of media item 121. In such embodiments, motion offset module 212 (or another module of media processing engine 131) can determine offset parameter(s) (e.g., horizontal motion parameters, etc.) associated with introducing motion between the frames to correct the one or more detected jumps or discontinuities. Transformation module 216 can apply one or more motion stabilization transformations to the frames to introduce the motion based on the determined offset parameter(s). By applying the one or more motion stabilization transformations based on the determined offset parameter(s), transformation module 216 can correct the jumps or discontinuities between the frames, which can reduce a complexity (e.g., a visual complexity) of media item 121.

Instruction generation module 218 can generate a set of stabilization reversal instructions 258 that cause a client device accessing media item 121 (e.g., client device 102N) to reverse the stabilization transformation(s) applied to media item 121 by transformation module 216. In some embodiments, the stabilization reversal instructions can be generated based an inverse horizontal translational motion, an inverse vertical translational motions, inverse rotational motions, inverse skew transformations, and/or inverse shear transformations to be applied to frames of media item 121 to reverse the stabilization transformation(s) applied to the video item. For example, if transformation module 216 applied a horizontal translational motion to one or more frames of media item 121 to reduce or correct a motion (i.e., indicated by a motion offset parameter 254), the set of instructions can indicate an inverse horizontal translational motion to reverse the applied horizontal translational motion. In some embodiments, each of the stabilization reversal instructions can include inverse motions corresponding to each motion of motion offset parameters 254.

After the motion stabilization transformation(s) are applied to media item 121, as described above, encoder engine 141 can encode media item 121 for transmission to one or more client devices requesting access to media item 121 (e.g., client device 102N). In some embodiments, encoding module 220 of encoder engine 141 can encode media item data streams and/or signals associated with media item 121 to generated encoded media item 124, in accordance with previously described embodiments. In response to receiving a request to access media item 121 from client device 102N, platform 120 can provide encoded media item 124 to client device 102. In some embodiments, platform 120 can transmit one or more media playback instructions 230 to client device 102N with encoded media item 124. Media playback instructions 230 can include one or more instructions associated with playing media item 124 via a media playback engine 240 residing on client device 102N. In some embodiments, media playback instructions 230 can include stabilization reversal instructions 258.

In additional or alternative embodiments, embedding module 222 can embed stabilization reversal instructions 258 into media item 121 before or after encoding media item 121 into encoded media item 124. For example, embedding module 222 can identify instructions corresponding to one or more stabilization reversal transformations to be applied to a respective frame of media item 121 by client device 102N. Embedded module 222 can embed the identified instructions with the respective frame, in some embodiments. Embedding instructions within a video frame refers to including the one or more instructions in a portion of the data stream and/or signal associated with the respective frame (e.g., by injecting code associated with the one or more instructions in the portion of the data stream and/or signal, etc.). Platform 120 can transmit the encoded media item 124 including the embedded instructions 258 to client device 102N, as described above. Media playback engine 240 can apply the stabilization reversal transformations in accordance with the stabilization reversal instructions 258, in accordance with embodiments described with respect to FIG. 6.

Figure 6:
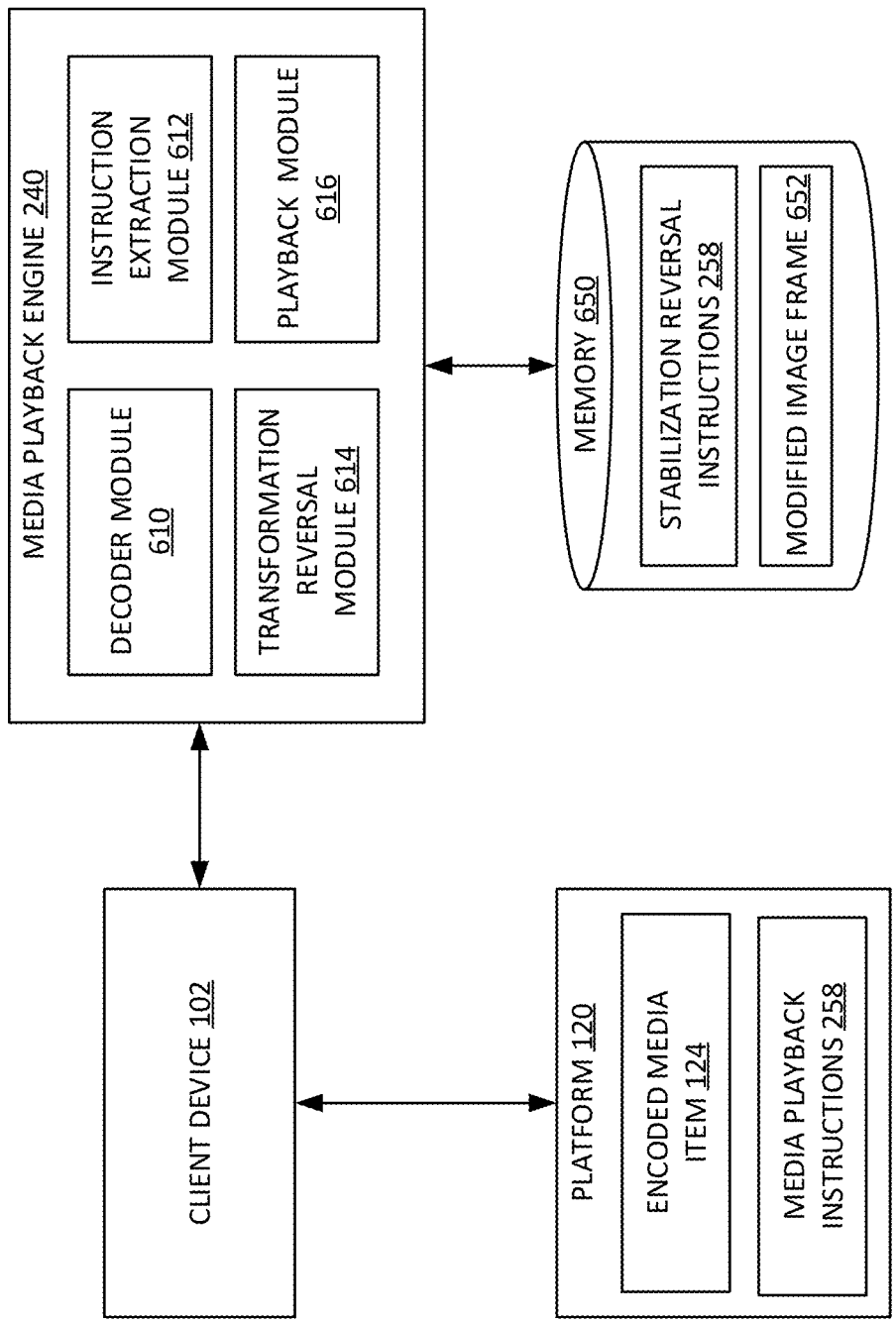
FIG. 6 is a block diagram, illustrating a media playback engine, in accordance with implementations of the present disclosure.

FIG. 6 is a block diagram, illustrating a media playback engine 240, in accordance with implementations of the present disclosure. As described above, each client device 102 can include a media playback engine 240. In some embodiments, media playback engine 240 can correspond to software residing on client device 102 that is used for playback of media items, such as media items 121 provided by platform 120. In other or similar embodiments, media playback engine 240 can be a component of a content viewing application (e.g., provided to client device 102 by platform 120), in accordance with embodiments described with respect to FIG. 1. In some embodiments, media playback engine 240 is connected to memory 650. Memory 650 can correspond to one or more memory devices associated with the client device 102 or other memory at or coupled to client device 102 (e.g., via network 104).

As described above, client device 102 can request access to a media item 121 from platform 120. Platform 120 can transmit an encoded data stream and/or signal associated with the requested media item 121 (e.g., encoded media item 124). In some embodiments, platform 120 can transmit media playback instructions 258 to client device 102 with encoded media item 124. Media playback instructions 258 can include stabilization reversal instructions 258, as described with respect to FIG. 2. In other or similar embodiments, stabilization reversal instructions can be embedded within encoded media item 124, as described above.

Decoder module 610 can decode encoded media item 124, as described above. Decoded media item 124 corresponds to media item 121, in some embodiments. Responsive to decoder module 610 decoding media item 124, instruction extraction module 612 can extract stabilization reversal instructions 258 from the decoded media item (i.e., media item 121), in some embodiments. For example, instruction extraction module 612 can parse through the decoded data stream and/or signal associated with media item 121 and identify the embedded stabilization reversal instructions 258. Responsive to identifying the stabilization reversal instructions 258, instruction extraction module 612 can store the instructions 258 at memory 650 and, in some embodiments, can remove the embedded instructions from the decoded data stream and/or signal. As indicated above, platform 120 can transmit stabilization reversal instructions 258 with encoded media item 124, in some embodiments. Accordingly, media playback engine 240 can obtain the stabilization reversal instructions from platform 120, in some embodiments.

Transformation reversal module 614 can reverse the motion stabilization transformation(s) applied to frames of media item 121 in accordance with the stabilization instructions 258. For example, as described above, the stabilization reversal instructions 258 can indicate one or more inverse motions (e.g., an inverse horizontal translational motion, an inverse vertical translational motion, an inverse rotational motion, etc.) to be applied to one or more frames of media item 121 to reverse the motion stabilization transformation(s) applied by video processing engine 131. Transformation reversal module 614 can apply the inverse translational motion(s) to the frames of media item 121, in accordance with the stabilization reversal instructions 258, to generate modified image frames 652 associated with media item 121.

As indicated above, in some embodiments, frame padding module 214 of media processing engine 131 can add or otherwise increase a number of pixels at one or more edges of a frame of media item 121 (referred to above as padding). The encoded media item 121 that is transferred to client device 102 can include such padding at one or more frames. Transformation reversal module 614 can, in some embodiments, remove (e.g., crop) the one or more regions of the frames of decoded media item 121 that were added to the edge(s) for the frames when the motion stabilization transformation(s) are reversed. For example, as described with respect to FIGS. 5A-5C, some regions of frames 510-530 can depict objects of environment 300 while other regions can include pixels added by frame padding module 214. In such example, after decoding, transformation reversal module 615 can remove the regions of frames 510-530 that include the added pixels while retaining the regions of frames 510-530 that depict objects 302 of environment 300. Accordingly, transformation reversal module 614 retains content that is originally included in frames 310-330 without destroying content of media item 121.

Playback module 616 can provide a playback of media item 121 to a user of client device 102. For example, playback module 616 can access modified image frames 652 via memory 650 and provide content of the modified image frames 652 to a user associated with client device 102 (e.g., via a graphical user interface (GUI) of client device 102. In some embodiments, the playback of media item 121 can depict motion between frames of media item 121.

Figure 7:
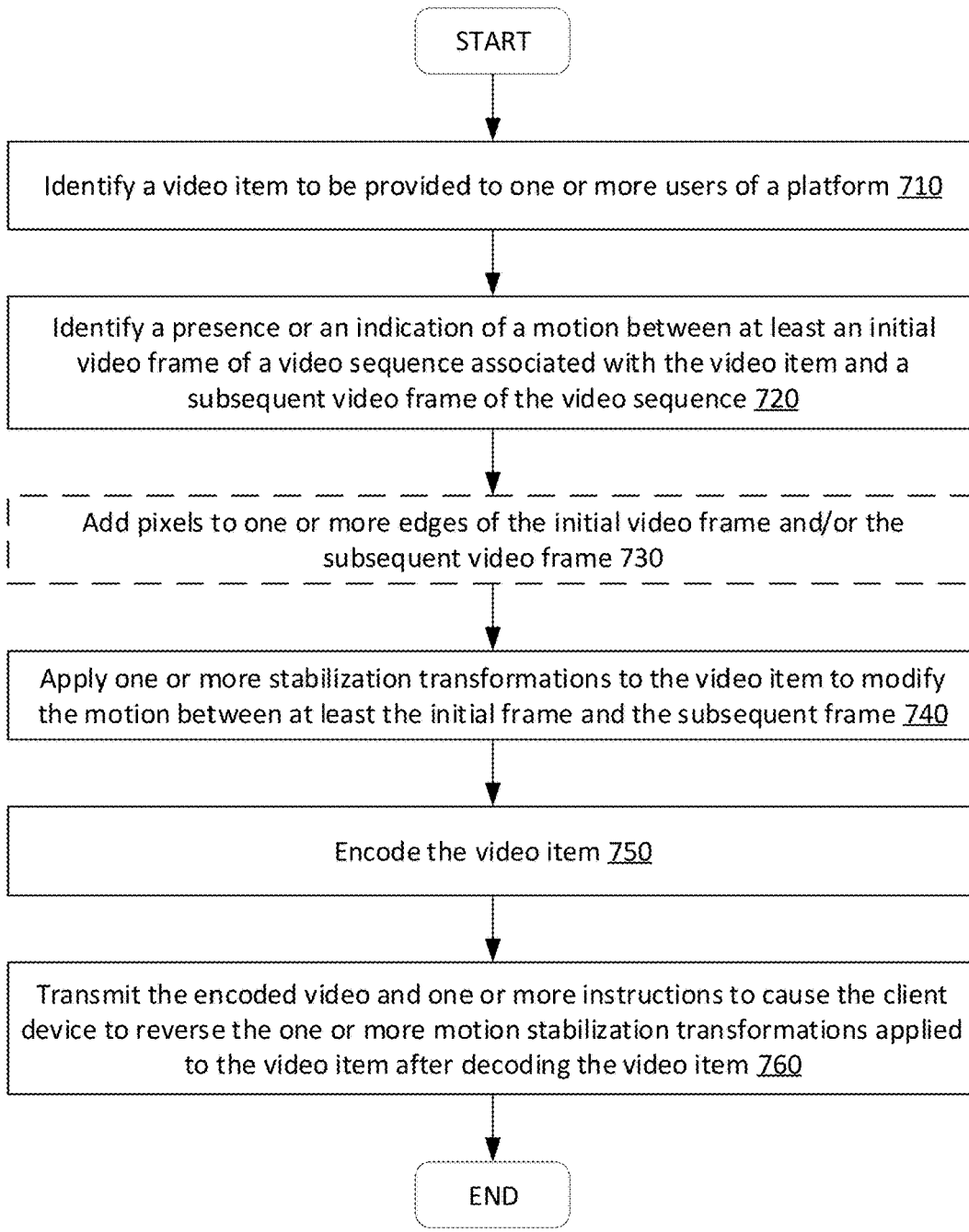
FIG. 7 depicts a flow diagram of a method for non-destructive, stabilization encoder optimization, in accordance with implementations of the present disclosure.
Figure 8:
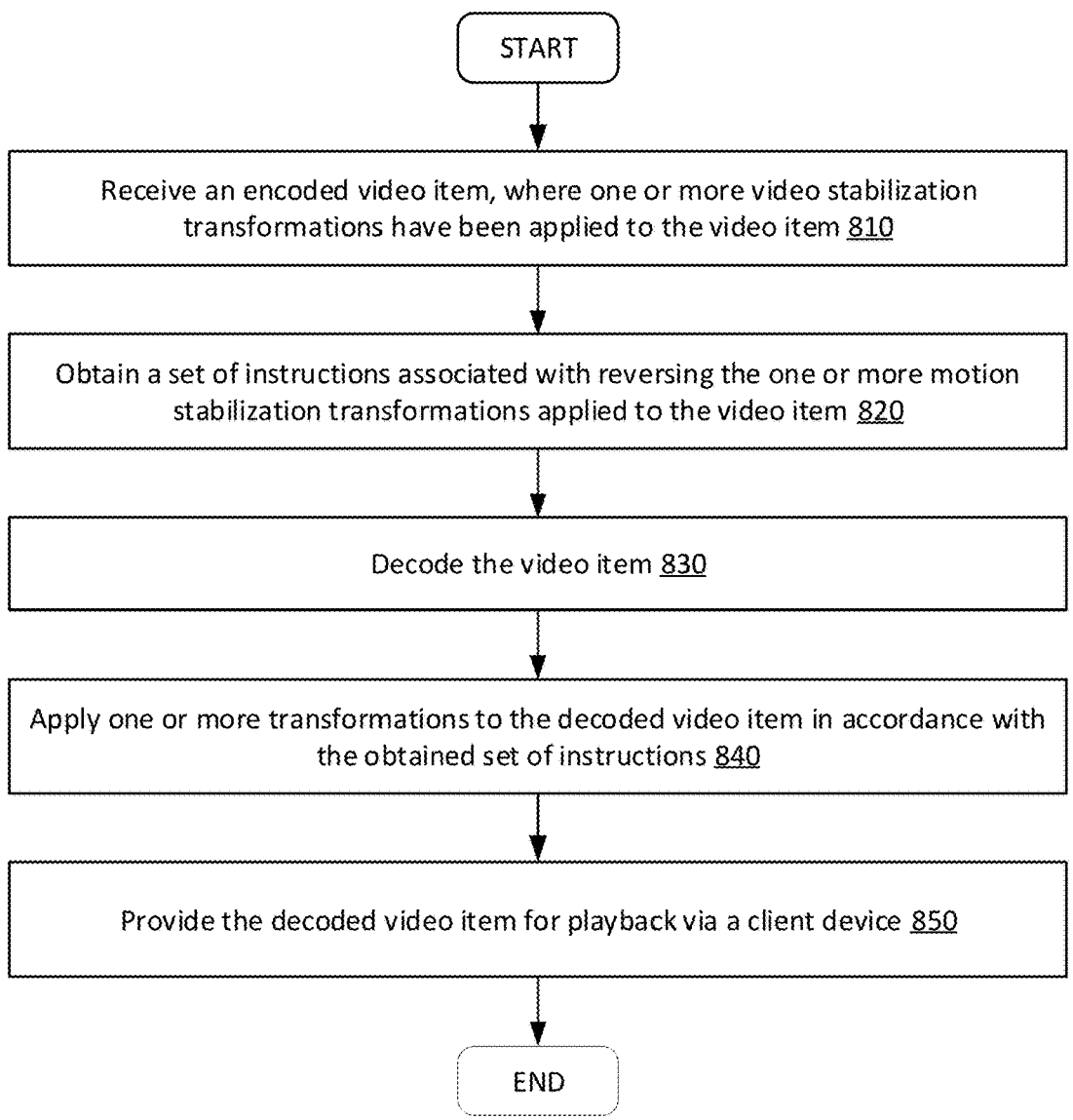
FIG. 8 depicts a flow diagram of a method for reversing motion stabilization transformation(s) applied to a media item, in accordance with implementations of the present disclosure.

FIG. 7 depicts a flow diagram of a method 700 for non-destructive, stabilization encoder optimization, in accordance with implementations of the present disclosure. FIG. 8 depicts a flow diagram of a method 800 for reversing motion stabilization transformation(s) applied to a media item, in accordance with implementations of the present disclosure. Methods 700 and 800 may be performed by processing logic that may include hardware (circuitry, dedicated logic, etc.), software (e.g., instructions run on a processing device), or a combination thereof. In one implementation, some or all the operations of methods 700 and 800 may be performed by one or more components of system 100 of FIG. 1. For example, some or all of the operations of method 700 may be performed by one or more components of platform 120 (e.g., video processing engine 131 and/or encoding engine 141). In another example, some or all of the operations of method 800 may be performed by one or more components of client device 102 (e.g., media playback engine 240).

At block 710, processing logic identifies a video item to be provided to one or more users of a platform. In some embodiments the video item can be provided by a client device (e.g., client device 102A) connected to the platform. At block 720, processing logic can identify a presence or an indication of a motion between an initial frame of a video sequence associated with the video item and a subsequent video frame of the video sequence. The motion between the initial frame and the subsequent frame can correspond to a difference between a first region of the initial frame that depicts one or more objects and a second region of the subsequent frame that depicts the one or more objects. For example, the motion can correspond to a horizontal translation of the one or more objects between the first region of the initial video frame and the second region of the subsequent video frame, a vertical translation of the one or more objects between the first region of the initial video frame and a second region of the subsequent video frame, or a rotational motion of the one or more objects between the first region of in initial video frame and the second region of the subsequent video frame. Video processing engine 131 can determine one or more motion parameters corresponding to the motion between the initial video frame and the subsequent video frame, in accordance with previously described embodiments.

At block 730, processing logic, optionally, adds pixels to one or more edges of the initial video frame and/or the subsequent video frame. The additional pixels can indicate unknown content data associated with the initial video frame and/or the subsequent video frame due to the detected motion. In some embodiments, the added pixels can be pixels that are added to edges of the initial video frame and/or the subsequent video frame to pad such frame(s), in accordance with previously described embodiments. At block 740, processing logic applies one or more stabilization transformations to the video item to correct the motion between at least the initial video frame and the subsequent video frame. Processing logic can apply the one or more stabilization transformations in accordance with previously described embodiments. At block 750 processing logic encodes the video item. In some embodiments, processing logic can embed instructions that cause the client device to reverse the motion stabilization transformation(s) into the media item before or after encoding, as described above. At block 760, processing logic transmits the encoded video and one or more instructions to cause the client device to reverse the stabilization transformation(s) applied to the video item after decoding the video item. The client device can extract the one or more instructions from the media item, in some embodiments. The client device can execute the instructions to reverse the stabilization transformation(s), in accordance with embodiments described with respect to FIG. 8.

As discussed above, FIG. 8 depicts a flow diagram of a method 800 for reversing motion stabilization transformation(s) applied to a media item, in accordance with implementations of the present disclosure. At block 810, processing logic receives an encoded video item. In some embodiments, one or more video stabilization transformations have been applied to the video item (e.g., by video processing engine 131). At block 820, processing logic obtains a set of instructions associated with reversing the one or more motion stabilization transformations applied to the encoded video item. In some embodiments, processing logic can obtain the set of instructions by extracting the instructions from the encoded video item, as previously described. In other or similar embodiments, processing logic can obtain the set of instructions from platform 120.

At block 830, processing logic can decode the encoded video item. At block 840, processing logic can apply one or more transformations to the decoded video item in accordance with the obtained set of instructions. The one or more transformations can correspond to inverse motions that reverse the transformations applied to correct or reduce the motion between frames of the video item. In additional or alternative embodiments, the one or more transformations can include removing (e.g., cropping) the pixels added to edges of one or more frames of the decoded video items, as described above. At block 850, processing logic can provide the decoded video item for playback via a client device. In some embodiments a media player of the client device can play the decoded video item, as described above.

Figure 9:
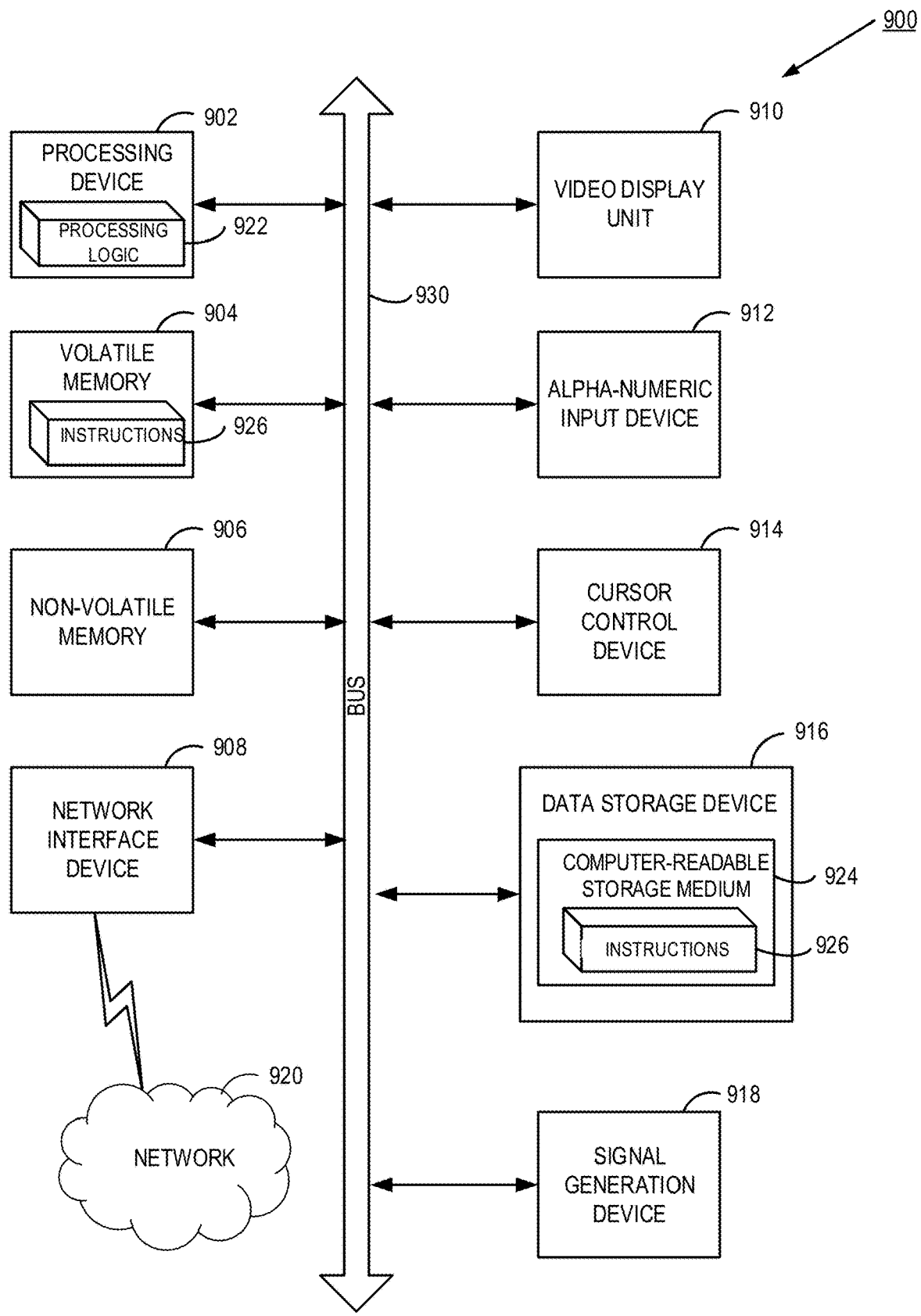
FIG. 9 is a block diagram illustrating an exemplary computer system, in accordance with implementations of the present disclosure.

FIG. 9 is a block diagram illustrating an exemplary computer system, in accordance with implementations of the present disclosure. The computer system 900 can be platform 120, the server machine 130, server machine 140, or client devices 102A-N in FIG. 1. The machine can operate in the capacity of a server or an endpoint machine in endpoint-server network environment, or as a peer machine in a peer-to-peer (or distributed) network environment. The machine can be a television, a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 900 includes a processing device (processor) 902, a main memory 904 (e.g., read-only memory (ROM), flash memory, dynamic random access memory (DRAM) such as synchronous DRAM (SDRAM), double data rate (DDR SDRAM), or DRAM (RDRAM), etc.), a static memory 906 (e.g., flash memory, static random access memory (SRAM), etc.), and a data storage device 918, which communicate with each other via a bus 940.

Processor (processing device) 902 represents one or more general-purpose processing devices such as a microprocessor, central processing unit, or the like. More particularly, the processor 902 can be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 902 can also be one or more special-purpose processing devices such as an application specific integrated circuit (ASIC), a field programmable gate array (FPGA), a digital signal processor (DSP), network processor, or the like. The processor 902 is configured to execute instructions 905 (e.g., for predicting channel lineup viewership) for performing the operations discussed herein.

The computer system 900 can further include a network interface device 908. The computer system 900 also can include a video display unit 910 (e.g., a liquid crystal display (LCD) or a cathode ray tube (CRT)), an input device 912 (e.g., a keyboard, and alphanumeric keyboard, a motion sensing input device, touch screen), a cursor control device 914 (e.g., a mouse), and a signal generation device 920 (e.g., a speaker).

The data storage device 918 can include a non-transitory machine-readable storage medium 924 (also computer-readable storage medium) on which is stored one or more sets of instructions 905 (e.g., for non-destructive, stabilization-based encoder optimization) embodying any one or more of the methodologies or functions described herein. The instructions can also reside, completely or at least partially, within the main memory 904 and/or within the processor 902 during execution thereof by the computer system 900, the main memory 904 and the processor 902 also constituting machine-readable storage media. The instructions can further be transmitted or received over a network 930 via the network interface device 908.

In one implementation, the instructions 905 include instructions for non-destructive, stabilization-based encoder optimization. While the computer-readable storage medium 924 (machine-readable storage medium) is shown in an exemplary implementation to be a single medium, the terms "computer-readable storage medium" and "machine-readable storage medium" should be taken to include a single medium or multiple media (e.g., a centralized or distributed database, and/or associated caches and servers) that store the one or more sets of instructions. The terms "computer-readable storage medium" and "machine-readable storage medium" shall also be taken to include any medium that is capable of storing, encoding or carrying a set of instructions for execution by the machine and that cause the machine to perform any one or more of the methodologies of the present disclosure. The terms "computer-readable storage medium" and "machine-readable storage medium" shall accordingly be taken to include, but not be limited to, solid-state memories, optical media, and magnetic media.

Reference throughout this specification to "one implementation," or "an implementation," means that a particular feature, structure, or characteristic described in connection with the implementation is included in at least one implementation. Thus, the appearances of the phrase "in one implementation," or "in an implementation," in various places throughout this specification can, but are not necessarily, referring to the same implementation, depending on the circumstances. Furthermore, the particular features, structures, or characteristics may be combined in any suitable manner in one or more implementations.

To the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), software, a combination of hardware and software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables hardware to perform specific functions (e.g., generating interest points and/or descriptors); software on a computer readable medium; or a combination thereof.

The aforementioned systems, circuits, modules, and so on have been described with respect to interact between several components and/or blocks. It can be appreciated that such systems, circuits, components, blocks, and so forth can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but known by those of skill in the art.

Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Finally, implementations described herein include collection of data describing a user and/or activities of a user. In one implementation, such data is only collected upon the user providing consent to the collection of this data. In some implementations, a user is prompted to explicitly allow data collection. Further, the user may opt-in or opt-out of participating in such data collection activities. In one implementation, the collect data is anonymized prior to performing any analysis to obtain any statistical patterns so that the identity of the user cannot be determined from the collected data.

What is claimed is:

1. A method comprising:
identifying a video item that is subject to one or more motion stabilization transformations applied to the video item, the one or more motion stabilization transformations pertaining to a motion between a plurality of video frames of a video sequence associated with the video item;
determining one or more operations to modify the one or more motion stabilization transformations applied to the video item;
performing the one or more operations to modify the one or more motion stabilization transformations applied to the video item; and
providing the video item for playback via a client device, wherein a playback of the video item depicts at least a portion of the motion between the plurality of video frames of the video sequence.

2. The method of claim 1, wherein the one or more motion stabilization transformations comprise at least one of:
a vertical translational motion applied one or more of the plurality of the video frames of the video sequence,
a horizontal translational motion applied to one or more of the plurality of video frames of the video sequence,
a rotational motion applied to one or more of the plurality of video frames of the video sequence, a skew transformation applied to one or more of the plurality of video frames of the video sequence, or a shear transformation applied to one or more of the plurality of video frames of the video sequence.

3. The method of claim 2, wherein the one or more operations correspond to at least one of:
inverting at least part of the horizontal translational motion,
inverting at least part of the vertical translational motion,
inverting at least part of the rotational motion,
inverting at least part of the skew transformation, or
inverting at least part of the shear transformation.

4. The method of claim 1, wherein the video item is encoded, and wherein the method further comprises:
decoding the video item, wherein the one or more operations to modify the one or more motion stabilization transformations are performed to the decoded video item.

5. The method of claim 1, wherein determining the one or more operations to modify the one or more motion stabilization transformations comprises:
identifying a set of instructions associated with the one or more operations, the set of instructions embedded within one or more of the plurality of video frames of the video sequence; and
extracting the set of instructions from the one or more of the plurality of video frames.

6. The method of claim 1, wherein determining the one or more operations to modify the one or more motion stabilization transformations comprises:
receiving, by the client device, a set of instructions associated with the one or more operations via a network.

7. The method of claim 1, wherein identifying the video item that is subject to one or more motion stabilization transformations applied to the video comprises:
receiving, by the client device, the video item from one or more computing devices associated with a platform.

8. The method of claim 7, wherein the platform comprises at least one of a content sharing platform or a video conferencing platform.

9. The method of claim 1, wherein one or more objects are depicted in a first region of an initial video frame of the plurality of video frames and in a second region of a subsequent video frame of the plurality of video frames, and wherein the motion between the plurality of video frames corresponds to at least one of a horizontal translational motion of the one or more objects between the first region and the second region, a vertical translational motion of the one or more objects between the first region of and the second region, a rotational motion of the one or more objects between the first region and the second region, a rolling shutter motion of the one or more objects in view of the first region and the second region, or a parallax motion of the one or more objects between the first region and the second region.

10. A system comprising:
a memory device; and
a set of one or more processing devices coupled to the memory device, the set of one or more processing devices to perform operations comprising:
identifying a video item that is subject to one or more motion stabilization transformations applied to the video item, the one or more motion stabilization transformations pertaining to a motion between a plurality of video frames of a video sequence associated with the video item;

determining one or more operations to modify the one or more motion stabilization transformations applied to the video item;
performing the one or more operations to modify the one or more motion stabilization transformations applied to the video item; and
providing the video item for playback via a client device, wherein a playback of the video item depicts at least a portion of the motion between the plurality of video frames of the video sequence.

11. The system of claim 10, wherein the one or more motion stabilization transformations comprise at least one of:
a vertical translational motion applied one or more of the plurality of the video frames of the video sequence,
a horizontal translational motion applied to one or more of the plurality of video frames of the video sequence,
a rotational motion applied to one or more of the plurality of video frames of the video sequence,
a skew transformation applied to one or more of the plurality of video frames of the video sequence, or
a shear transformation applied to one or more of the plurality of video frames of the video sequence.

12. The system of claim 11, wherein the one or more operations correspond to at least one of:
inverting at least part of the horizontal translational motion,
inverting at least part of the vertical translational motion,
inverting at least part of the rotational motion,
inverting at least part of the skew transformation, or
inverting at least part of the shear transformation.

13. The system of claim 10, wherein the video item is encoded, and wherein the operations further comprise:
decoding the video item, wherein the one or more operations to modify the one or more motion stabilization transformations are performed to the decoded video item.

14. The system of claim 10, wherein determining the one or more operations to modify the one or more motion stabilization transformations comprises:
identifying a set of instructions associated with the one or more operations, the set of instructions embedded within one or more of the plurality of video frames of the video sequence; and
extracting the set of instructions from the one or more of the plurality of video frames.

15. The system of claim 10, wherein determining the one or more operations to modify the one or more motion stabilization transformations comprises:
receiving, by the client device, a set of instructions associated with the one or more operations via a network.

16. A non-transitory computer readable storage medium comprising instructions for a server that, when executed by a set of one or more processing devices, cause the set of one or more processing devices to perform operations comprising:
identifying a video item that is subject to one or more motion stabilization transformations applied to the video item, the one or more motion stabilization transformations pertaining to a motion between a plurality of video frames of a video sequence associated with the video item;
determining one or more operations to modify the one or more motion stabilization transformations applied to the video item;

performing the one or more operations to modify the one or more motion stabilization transformations applied to the video item; and providing the video item for playback via a client device, wherein a playback of the video item depicts at least a portion of the motion between the plurality of video frames of the video sequence.

17. The non-transitory computer readable storage medium of claim 16, wherein the one or more motion stabilization transformations comprise at least one of:
 a vertical translational motion applied one or more of the plurality of the video frames of the video sequence,
 a horizontal translational motion applied to one or more of the plurality of video frames of the video sequence,
 a rotational motion applied to one or more of the plurality of video frames of the video sequence,
 a skew transformation applied to one or more of the plurality of video frames of the video sequence, or
 a shear transformation applied to one or more of the plurality of video frames of the video sequence.

18. The non-transitory computer readable storage medium of claim 17, wherein the one or more operations correspond to at least one of:
 inverting at least part of the horizontal translational motion,
 inverting at least part of the vertical translational motion,
 inverting at least part of the rotational motion,
 inverting at least part of the skew transformation, or
 inverting at least part of the shear transformation.

19. The non-transitory computer readable storage medium of claim 16, wherein the video item is encoded, and wherein the operations further comprise:
 decoding the video item, wherein the one or more operations to modify the one or more motion stabilization transformations are performed to the decoded video item.

20. The non-transitory computer readable storage medium of claim 16, wherein determining the one or more operations to modify the one or more motion stabilization transformations comprises:
 identifying a set of instructions associated with the one or more operations embedded within one or more of the plurality of video frames of the video sequence; and
 extracting the set of instructions from the one or more of the plurality of video frames.

\* \* \* \* \*